(12) United States Patent
Lea et al.

(10) Patent No.: US 10,997,407 B2
(45) Date of Patent: May 4, 2021

(54) DETECTING DOCUMENT OBJECTS

(71) Applicant: Hewlett-Packard Development Company, L.P., Houston, TX (US)

(72) Inventors: Perry Lea, Meridian, ID (US); Eli Saber, Rochester, NY (US); Osborn De Lima, Rochester, NY (US); David C. Day, Boise, ID (US); Peter Bauer, Boise, ID (US); Mark Shaw, Boise, ID (US); Roger S. Twede, Boise, ID (US); Shruty Janakiraman, Rochester, NY (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 383 days.

(21) Appl. No.: 15/747,740

(22) PCT Filed: Oct. 2, 2015

(86) PCT No.: PCT/US2015/053762
§ 371 (c)(1),
(2) Date: Jan. 25, 2018

(87) PCT Pub. No.: WO2017/058252
PCT Pub. Date: Apr. 6, 2017

(65) Prior Publication Data
US 2018/0225508 A1 Aug. 9, 2018

(51) Int. Cl.
*G06K 9/00* (2006.01)
*G06K 9/46* (2006.01)

(52) U.S. Cl.
CPC ....... *G06K 9/00469* (2013.01); *G06K 9/4633* (2013.01); *G06K 9/4647* (2013.01)

(58) Field of Classification Search
None
See application file for complete search history.

(56) References Cited

U.S. PATENT DOCUMENTS

| 6,574,366 | B1 | 6/2003 | Fan |
| 2003/0007683 | A1* | 1/2003 | Wang ................. G06K 9/00456 382/159 |

(Continued)

FOREIGN PATENT DOCUMENTS

WO   WO-03105087 A1   12/2003

OTHER PUBLICATIONS

International Searching Authority, "Search Report and Written Opinion, Application No. PCT/US2015/053762", dated Jun. 30, 2016, 15 pages.

(Continued)

*Primary Examiner* — David Perlman
(74) *Attorney, Agent, or Firm* — Brooks Cameron & Huebsch PLLP

(57) ABSTRACT

Example implementations relate to detecting document objects. For example, detecting document objects may include a system comprising a pre-processing engine to establish a threshold for a document, wherein a structure of the document is unknown, a detection engine to detect a candidate area in the document, using a Hough transform and connected component analysis to merge detected candidate areas in the Hough transform to a same document object in the document, and a classification module to classify the candidate area as a document object or not a document object.

20 Claims, 9 Drawing Sheets

(56) References Cited

U.S. PATENT DOCUMENTS

| | | |
|---|---|---|
| 2003/0235327 A1 | 12/2003 | Srinivasa |
| 2004/0194035 A1 | 9/2004 | Chakraborty |
| 2006/0164682 A1 | 7/2006 | Lev |
| 2006/0261541 A1 | 11/2006 | He |
| 2010/0100743 A1 | 4/2010 | Ali et al. |
| 2010/0195910 A1 | 8/2010 | Tsay et al. |
| 2010/0235727 A1 | 9/2010 | Ashton et al. |
| 2011/0035661 A1 | 2/2011 | Balinsky et al. |
| 2014/0029853 A1* | 1/2014 | Xue .............. G06K 9/18 382/182 |
| 2014/0270536 A1* | 9/2014 | Amtrup .......... G06K 9/00483 382/195 |
| 2015/0010233 A1* | 1/2015 | Barman .......... G06K 9/36 382/167 |
| 2016/0162761 A1* | 6/2016 | Bulan ............ G06K 9/00456 382/104 |

OTHER PUBLICATIONS

Zhu, et al., "Signature Detection and Matching for Document Image Retrieval", 2009, IEEE, pp. 35. http://lampsrv02.urniacs.umd.edu/20FB7B58-EE43-4823-9C02-518CE8925468/FinalDownload/DownloadID-07E71F19AEBCD01F21D509501918BD8A/20FB7B58-EE43-4B23-9C02-51BCE8925468/pubs/Papers/SignatureDetectMatch_PAMI2009/SignatureDetectMatch_PAMI2009.pdf.

\* cited by examiner

DETECTING DOCUMENT OBJECTS

CLAIM FOR PRIORITY

The present application is a national stage filing under 35 U.S.C. § 371 of PCT application number PCT/US2015/053762, having an international filing date of Oct. 2, 2015, the disclosure of which is hereby incorporated by reference in its entirety.

BACKGROUND

A document, such as a scanned document, may include a plurality of words, phrases, objects and/or symbols. Additionally, various actions may be performed on the document. The document may be searched such that specific words, phrases, objects and/or symbols may be identified.

DETAILED DESCRIPTION

A document may include a plurality of sections for user input and/or user action. For instance, a document may include an object or a plurality of objects indicating a location for a signature, a location for an initial, and/or a location for other user input, among other examples. With respect to such documents, as the terms, format and/or structure of the documents are changed, the location or locations where particular user action is to be taken may change. As such, challenges may arise in locating all document objects requiring user input where no prior knowledge of the structure and/or format of the document is had.

In contrast, detecting document objects according to the present disclosure allows for the location of document objects without prior knowledge of the structure of the document itself. For example, the word "signature", and various derivations of the word, may be located in the document, and a line may be detected within a threshold distance of the word. The identification of the word "signature" and a line nearby may indicate the presence of a signature field requiring input from a user. Examples are not so limited, however, and other forms of document objects aside from the word "signature" and an associated line may be detected, as discussed further herein.

In the foregoing detailed description, detecting document objects in scanned documents is described. Detecting document objects according to the present disclosure is a fast and computationally efficient technique that avoids image to text processes such as Optical Character Recognition (OCR). The detection of document objects may be used in different ways to enhance user experience and expedite handling of electronic documents. For instance, detection of document objects according to the present disclosure may guide a user through a document to places where a signature is required, and/or may scan the document to ensure that all necessary signatures have been collected. Further, detection of document objects according to the present disclosure may be trainable by an end user such that other document objects may be located.

Figure 1:
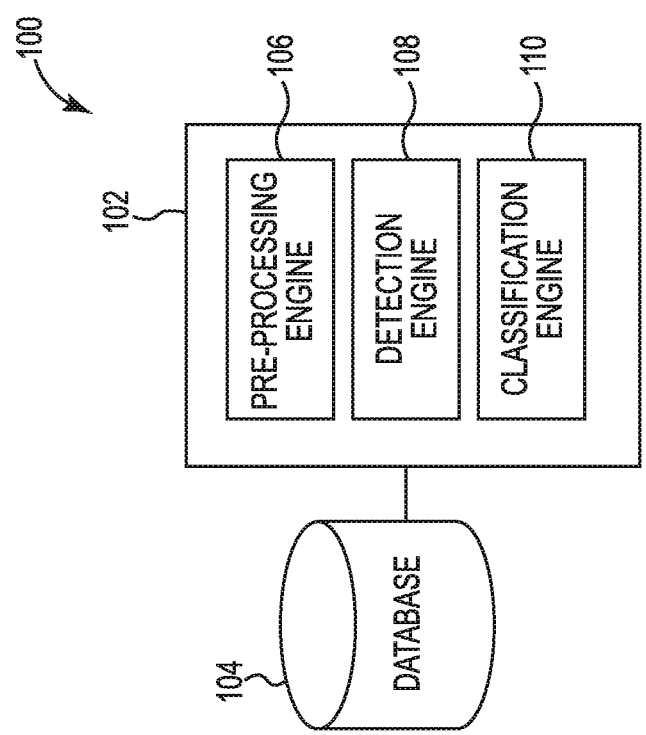
FIG. 1 illustrates a diagram of an example system for detecting document objects, according to the present disclosure.

FIG. 1 illustrates a diagram of an example system 100 for detecting document objects, according to the present disclosure. The system 100 may include a database 104, a document object detection system 102, and/or a number of engines (e.g., pre-processing engine 106, detection engine 108, classification engine 110). The document object detection system 102 may be in communication with the database 104 via a communication link, and may include the number of engines (e.g., pre-processing engine 106, detection engine 108, classification engine 110). The document object detection system 102 may include additional or fewer engines that are illustrated to perform the various actions as will be described in further detail in connection with FIGS. 2-9.

The number of engines (e.g., pre-processing engine 106, detection engine 108, classification engine 110) may include a combination of hardware and programming, but at least hardware, that is configured to perform actions described herein (e.g., establish a threshold for a document, wherein a structure of the document is unknown, etc.) stored in a memory resource (e.g., computer readable medium, machine readable medium, etc.) as well as hard-wired program (e.g., logic).

The pre-processing engine 106 may include hardware and/or a combination of hardware and programming, but at least hardware, to establish a threshold for a document, wherein a structure of the document is unknown. An input grayscale document may be pre-processed by the pre-processing engine 106. Pre-processing may consist of noise removal and image enhancement in addition to thresholding. As used herein, to establish a threshold for a document refers to converting the document (e.g., the image of the document) from grayscale to binary code based on a specified threshold.

The pre-processing engine 106 may also remove noise from the document, enhance the contrast of the document, and/or lower the resolution of the document image for faster processing. Documents may have a white background with black text implying the background to have higher intensity than the text. As such, the binary image generated from the document by the pre-processing engine 106 may be white text on black background. Therefore, gray levels lower than the threshold value may be set to one and pixels with intensity above the threshold may be set to zero. For instance, a threshold of 0.65 (with intensity levels ranging from 0 to 1) may be chosen, such that pixels with a gray level above 0.65 would be set (e.g., thresholded) to a value of 0, and pixels with a gray level below 0.65 would be set (e.g., thresholded) to a value of 1.

The detection engine 108 may include hardware and/or a combination of hardware and programming, but at least hardware, to detect a candidate area in the document, using a Hough transform and connected component analysis to merge detected candidate areas in the Hough transform to a same document object in the document. As used herein, a Hough transform refers to a technique used in image processing for the global detection of lines of different angles in images. In a Hough transform, the xy plane where the image lies is expressed in the parameter space (e.g., the Hough space). The Hough transform may be performed by considering a representation of the line given in equation below:

$$x \cos \theta + y \sin \theta = \rho \qquad (1)$$

In some examples, the detection engine 108 may detect horizontal lines, and the above equation may be evaluated for all x and y coordinates that are "one" in the binary image, with $\theta=\pi/2$. This will provide the $\rho$ for each pixel in the document, which is in fact the horizontal coordinate for that pixel.

In some examples, an accumulator array may maintain a count of the number of pixels for each row of the image. For each non zero value in that accumulator array, the coordinates of any line with a minimum length of 40 pixels may be determined. Additionally, a parameter allowing for a separate line to be formed in the same row, if there is at least one "zero" pixel separating them, may be specified.

The classification engine 110 may include hardware and/or a combination of hardware and programming, but at least hardware, to classify the candidate area as a document object or not a document object. Notably, not all document objects would be detected—only those document objects specified for detection by a user would be detected. The classification engine 100, may search through each of the regions around the candidate areas and determine if the candidate area is a document object. In order to accomplish that, the original grayscale document may be utilized, and for each candidate area within the document, the region around the candidate area may be extracted.

To determine if a candidate area is indeed a document object, such as a signature line, the region around the candidate area may be examined. During examination, key words may be searched for, such as "Signature", and "Sign" (among other examples) in various fonts and sizes. To examine the candidate area, the candidate area may be extracted for processing. As discussed further in relation to FIG. 2, region extraction may include removing a fixed region around the candidate area, but also examining presence of content below the candidate area and to the left of the candidate area.

Figure 2:
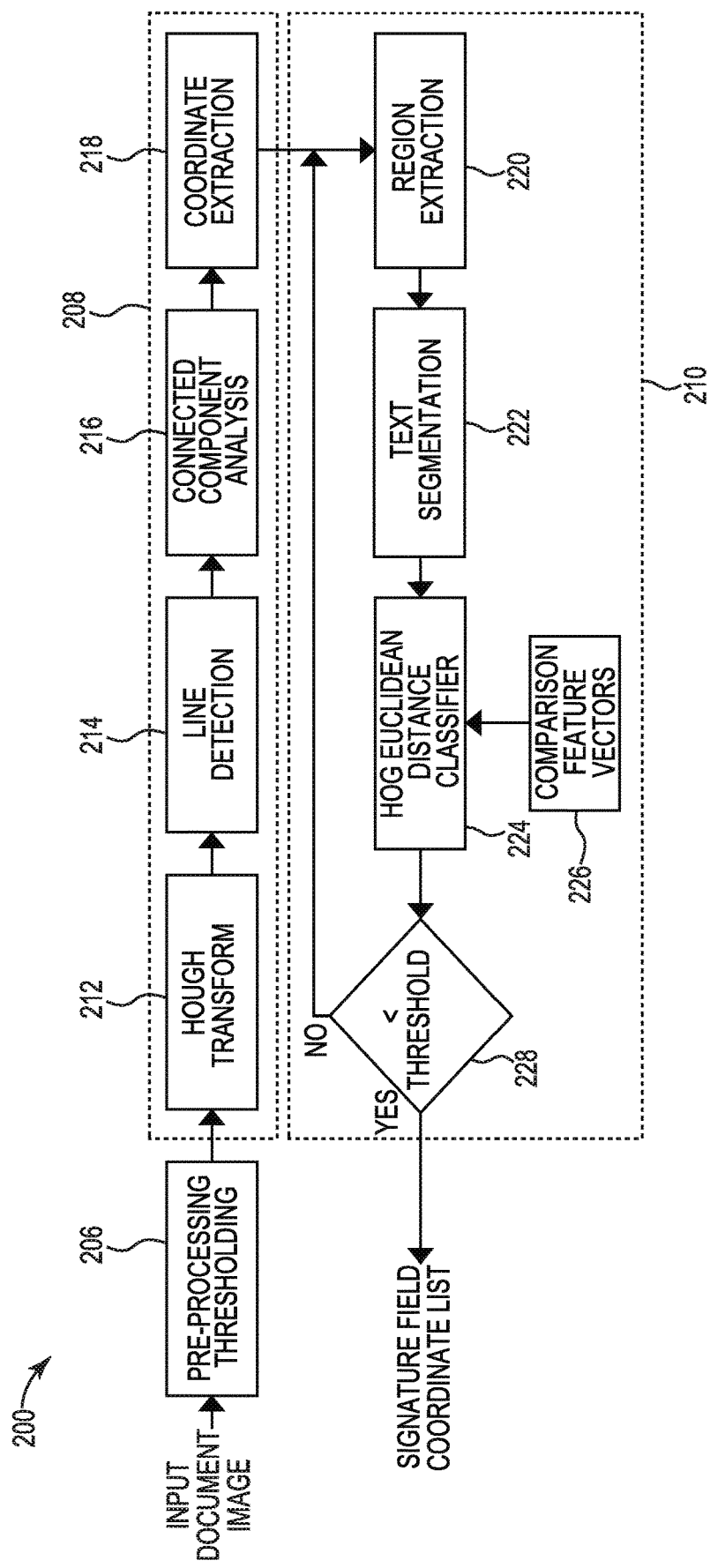
FIG. 2 further illustrates a diagram of an example system for detecting document objects, according to the present disclosure.

FIG. 2 further illustrates a diagram of an example system 200 for detecting document objects, according to the present disclosure. As discussed in relation to FIG. 1, the system 200 may include three main engines: the pre-processing engine 206 (e.g., 106 illustrated in FIGS. 1 and 206 illustrated in FIG. 2), the detection engine 208 (e.g., 108 illustrated in FIGS. 1 and 208 illustrated in FIG. 2), and the classification engine 210 (e.g., 110 illustrated in FIGS. 1 and 210 illustrated in FIG. 2).

As illustrated in FIG. 2, the input grayscale image (e.g., the image of the document) may be pre-processed by the pre-processing engine 206. As described in relation to FIG. 1, pre-processing may include noise removal and image enhancement in addition to establishing a threshold for the document. The result of pre-processing by the pre-processing engine 206 may be a binary image that is passed on to the detection engine 208.

Using the detection engine 208, candidate areas in the document that satisfy particular criterion may be determined. For example, at 212, a Hough transform for a single angle, such as 90°, may be applied to the binary image generated by the pre-processing engine 206. At 214, lines may be detected using the Hough transform, for instance, using the equation x cos $\theta$+y sin $\theta$=$\rho$. While the foregoing example describes utilizing an angle of 90°, examples are not so limited. Any angle may be specified for identifying particular document objects.

After lines are detected at 214, and based on the example of using an angle of 90° for the Hough transform, multiple horizontal lines may be detected for a single actual line. Put another way, multiple horizontal lines may be detected during the Hough transform for a single line displayed on the input document image. The number of and location of lines in the document may guide the search for document objects, such as the word Signature and its variants, and the number of detected lines may dictate the number of candidate areas.

To remove the aforementioned case of redundant lines, at 216, connected component analysis with 8 connectivity may be performed on the binary image with the initial Hough lines pixels set to 1. As used herein, connected component analysis refers to an algorithmic application of graph theory, where subsets of connected components are uniquely labeled based on a given heuristic. That is, using connected component analysis with connectivity, a plurality of lines which are actually representative of a single line in the input document image, may be labeled as being connected components. The eight connectivity basis allows for a pixel under consideration to be labelled as belonging to a certain group, if any of the four pixels to the top, bottom, right, left or either diagonal are part of the group.

At 218, the coordinates of each candidate region may be extracted. As discussed in relation to FIG. 1, the Hough transform is performed by considering a representation of the line given in x cos $\theta$+y sin $\theta$=$\rho$. This equation may be evaluated for all x and y coordinates that have a value of "one" in the binary image, which will result in the determination of $\rho$ for each pixel, where p is the horizontal coordinate for that pixel.

The detection engine 208 may then provide a list of coordinates of lines to the classification engine 210. In the foregoing example where an angle of 90° was used for the Hough transform, the detection engine 208 may provide a list of coordinates for each horizontal line detected in the document, to the classification engine 210. In turn, the classification engine 210 may search regions around the candidate areas (e.g., the lines provided by the detection engine 208) and determine if each candidate area is a document object or not. Put another way, the classification engine 210 may search around each of the horizontal lines and determine if each horizontal line is a signature line or not. While a signature line is used herein as an example of a document object, examples are not so limited and the classification engine 210 may search for other types of document objects other than signature lines. For example, the classification engine 210 may search for a symbol, such as a triangle, a company logo, and/or an initial box, among others.

The classification engine 210 may perform a number of actions to determine if a candidate area is a document object or not. For example, the classification engine 210 may perform region extraction at 220, text segmentation at 222, utilize a Histogram of Gradients (HoG) Euclidean distance classifier at 224, and determine if the candidate area is below a threshold at 228. At 220, region extraction may include removing a fixed region around the candidate area, but also examining the presence of content below the candidate area and to the left of the candidate area. This may be done by looking at a small region and checking for the width of content.

Similarly, at 222, text segmentation may be performed to isolate text from the candidate area and analyze it for the intended purpose. As discussed further in relation to FIG. 5, the text segmentation may be achieved through multiple passes of horizontal and vertical projections.

At 224, a HoG Euclidean Distance Classifier may evaluate the isolated text from the candidate area for comparison against feature vectors 226. Each isolated text from the candidate area may be compared against a threshold value at 228, such that anything below the threshold value will be determined to be a document object, and anything meeting and/or exceeding the threshold value will be determined to not be a document object. Once all document objects are identified, a list including the region coordinates of each candidate area among the plurality of candidate areas classified as a document object, may be generated.

Figure 3:
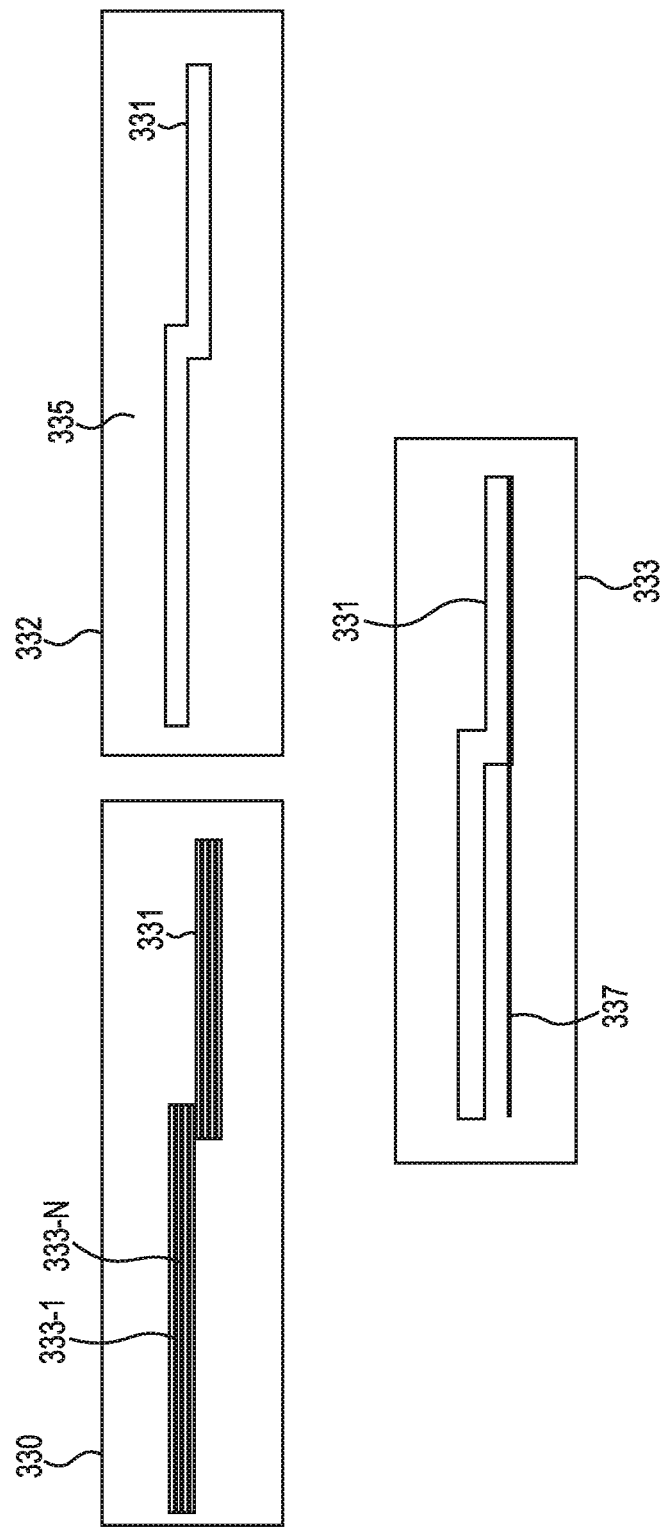
FIG. 3 illustrates an example of line detection according to the present disclosure.

FIG. 3 illustrates an example of line detection according to the present disclosure. As described in relation to FIG. 2, the detection engine 208, via the Hough transform and line detection process, may identify items such as horizontal lines, meeting a particular threshold length. For example, the detection engine 208 may detect all horizontal lines within the document having at least 40 pixels in length. However, as FIG. 3 illustrates, multiple lines may be found for a single straight line in the document. This may be due to the fact that at a pixel level for a scanned document, a single line may be multiple pixels thick. Additionally, due to the skew associated with the image acquisition process, a single line in the document may be made up of several disjointed horizontal Hough lines. As illustrated at 330, the line 331 is broken and skewed, and includes a plurality of redundant lines 333-1, 333-N. In order to reduce the number of redundant lines and consequently the number of search regions, a merging process, such as connected component analysis, may be performed.

As described in relation to FIG. 2, connected component analysis with an eight connectivity basis may be applied on the binary image wherein all the pixels of the lines detected (e.g., at 214 illustrated in FIG. 2) are set to 1. The eight connectivity basis allows for a pixel under consideration to be labelled as belonging to a certain group, if any of the four pixels to the top, bottom, right, left or either diagonal are part of the group. For example, referring to 332, connected component analysis with eight point connectivity basis may be performed for line 331, resulting in a labeling of pixels 335 as belonging to line 331. For each labelled pixel 335, horizontal projection techniques may be used to determine the starting point and the ending point of the line covering that region, e.g., line 331.

In some examples, a final length criterion may be imposed which may help identify which candidate areas correspond to document objects. For example, a final length criterion of 100 pixels may be imposed which specifies that lines that may be a signature line (e.g., a type of document object) must be 100 pixels or longer. Therefore, lines of a minimum length that are perfectly horizontal overcoming the skew associated with scanning the document as well as the jagged nature of certain lines, as is seen in 332, may be identified. As such, 333 illustrates the line 331 after connected component analysis, where all redundant lines are removed and a single line 331 is illustrated, with a corrected line 337 correcting the skew and jagged nature of the line 331.

Figure 4:
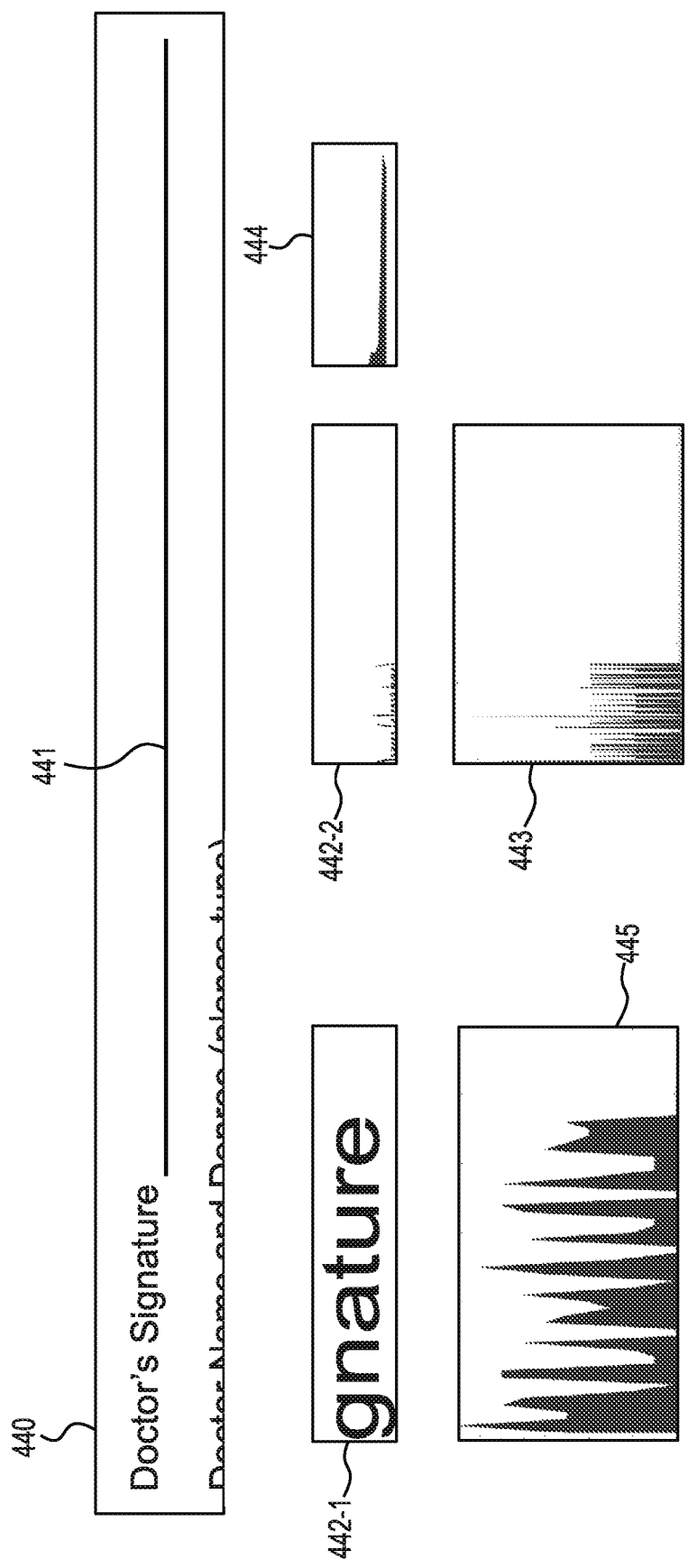
FIG. 4 illustrates an example of region extraction according to the present disclosure.

FIG. 4 illustrates an example of region extraction according to the present disclosure. In order to determine if a candidate area is indeed a document object (e.g., if a candidate line is indeed a signature line), the region around the candidate area may be examined and searched for key words such as Signature, Sign, among other examples, in various fonts and sizes. The first step in that process is extracting the region for processing for each candidate line separately.

Region extraction, as illustrated, may be performed by the classification engine (e.g., 110 illustrated in FIGS. 1 and 210 illustrated in FIG. 2). Region extraction, as described herein, includes not only removing a fixed region around a candidate area (e.g., a line), but prior to that, examining presence of content below the line and to the left of the line.

As illustrated in FIG. 4, region extraction may be performed on candidate area 440. During region extraction, the black line 441 in the candidate area may be of no interest, and pixels containing the line 441 may be set to white using a Hough lines map obtained from the line detection stage (e.g., illustrated at 214 in FIG. 2). Small regions 442-1 and 442-2 may be extracted from 440 for verifying content from candidate area 440. Further, vertical projections 443, 445 on the binary image with white text pixels on a black background, may provide information of the width of text in the candidate area 440. That is, a vertical projection profile 443, 445, may be generated for various portions of the candidate area 440. Similarly, a horizontal projection profile 444 may be generated for various portions of the candidate area 440. If the projection profile (e.g., vertical projection profile 443, 445 and/or horizontal projection profile 444) has at least five pixels of content in any location, it is determined that the portion of the candidate area 440 corresponding to the projection profile is of interest. As used herein, to be an "area of interest" refers to a portion of the document that may include a document object. Put another way, if the projection profile has at least a threshold number of pixels of content in any location, the portion of the candidate area corresponding to the projection profile is determined to possibly contain a document object (such as a signature line).

It should be noted that when examining the region to the bottom of the line 441, an extra parameter of where the content lies may be taken into consideration. For example, a threshold distance below the line 441 may be established which clarifies how close pixels must be to the line 441 in order to be associated with the line 441. If content exists both below and to the left of the line 441, the entire region 440 may be extracted. As illustrated in FIG. 4, the region to the left of the line 441 is searched at (b), and a true condition may be returned since, the small region 442-1 has one region of more than five pixels width.

Similarly, as illustrated in FIG. 4, since the vertical projection profile 443 shown at (c) satisfies the five pixel width condition, the small region 442-2 would be extracted as well. However, the horizontal projection profile 444 illustrates that the content from small region 442-2 is less than 10 pixels high, implying that the content of the small region 442-2 is most likely not belonging to the region around the line 441 in consideration. That is, a threshold number of pixels may be specified for both a horizontal projection and vertical projection, and extracted portions of the candidate area must meet or exceed the specified threshold for both projections in order to be considered a document object.

Figure 5:
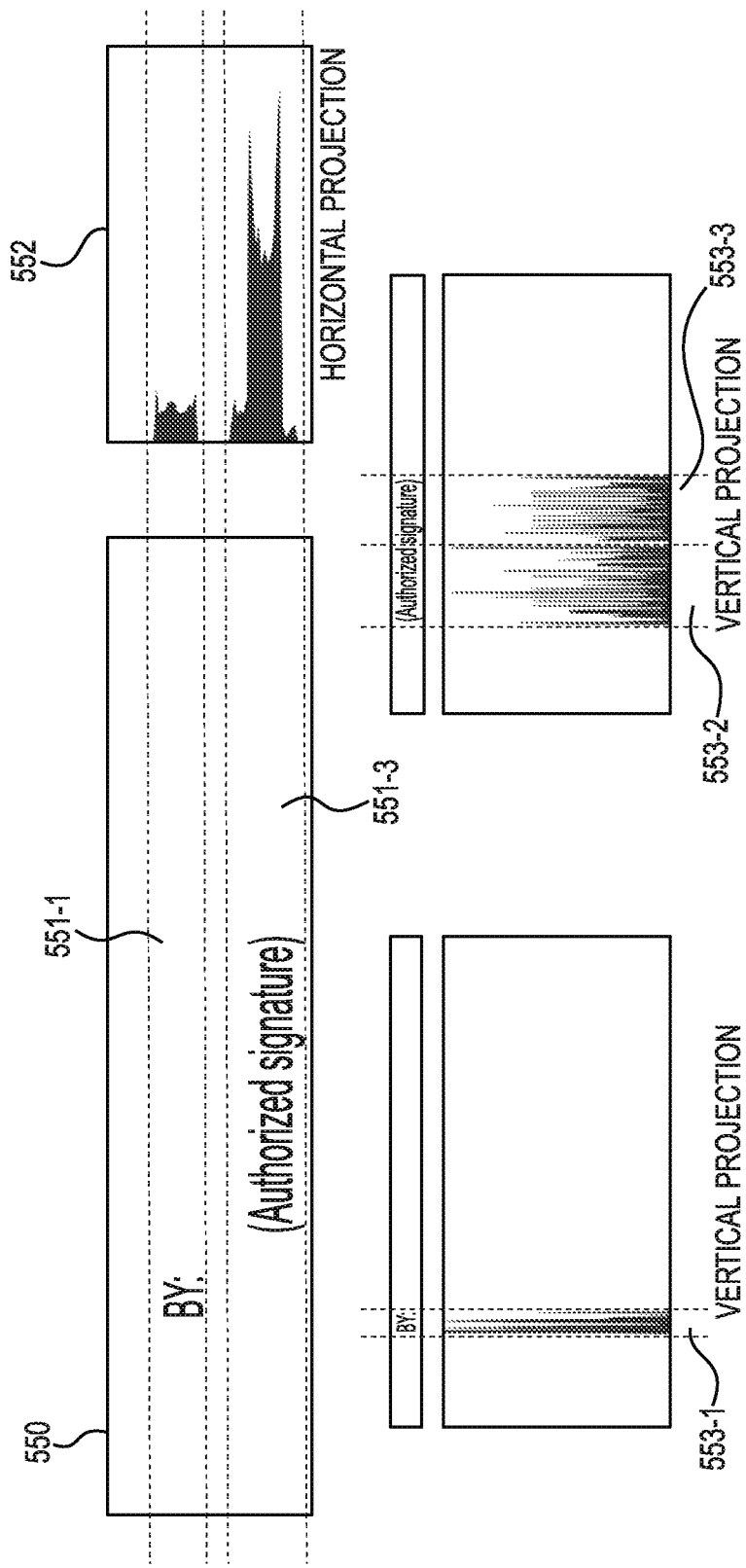
FIG. 5 illustrates an example text segmentation process according to the present disclosure.

FIG. 5 illustrates an example text segmentation process according to the present disclosure. As illustrated in FIG. 5, a procedure to segment text and analyze the segmented text for the intended purpose may be achieved through multiple passes of horizontal and vertical projections.

First, a horizontal projection 552 on an extracted region 550 (e.g., of a candidate area) may separate the candidate area into horizontal strips 551-1, 551-3. For each horizontal strip, vertical projections 553-1, 553-2, 553-3 may segment individual words and symbols. For example, as illustrated in FIG. 5, a vertical projection 553-1 may segment the word "By" from extracted region 550. Similarly, vertical projection 553-2 may segment the word "Authorized" and the vertical projection 553-3 may segment the word "Signature".

The parameters for vertical projections 553-1, 553-2, 553-3 may be accordingly adjusted so as to group words together and avoid segmenting individual letters. For instance, the letters of the word "Authorized" would not be segmented into individual letters. Also, it should be noted prior to entering the HoG Euclidean Distance Classifier (e.g., 224 illustrated in FIG. 2), a second horizontal segmentation may be performed. For instance, a second horizontal segmentation may be performed on an extracted word (e.g., "By", "Authorized", "Signature" illustrated in FIG. 5) in order to compensate for skewed text brought up due to the scanning process. Put another way, a second horizontal segmentation may be performed on vertical segments 553-1, 553-2, 553-3.

Prior to entering the HoG Euclidean Distance Classifier for comparison, an aspect ratio test may be implemented. The aspect ratio, as used herein, refers to the ratio of the width of the image to height of the image in pixels. For example, the height of the horizontal strip 551-1 may be compared to the width of the vertical strip 553-1, to obtain the aspect ratio for the "By" image (e.g., segmented text). Segmented text with an aspect ratio between 1.6 and 6.7 may sent to the HoG Euclidean Distance Classifier. In other words, segmented text with an aspect ratio within a threshold range may be sent to a HoG Euclidean Distance Classifier. This allows long words, or small words, single letters or graphics, that are not of interest to be avoided and not classified, thus saving on processing time and resources.

Figure 6:
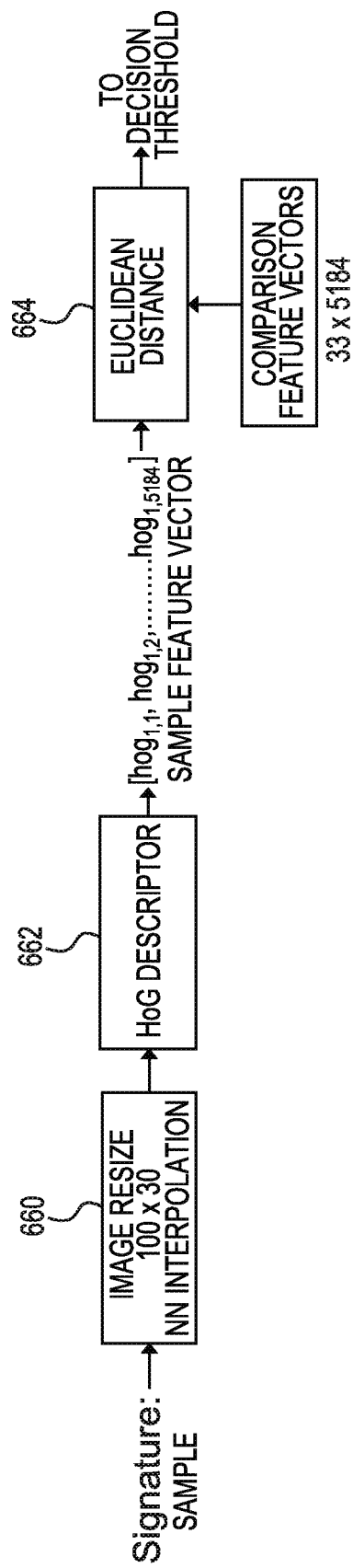
FIG. 6 illustrates an example process for sample text classification according to the present disclosure.

FIG. 6 illustrates an example process for sample text classification according to the present disclosure. Histogram of Gradients (HoG), as used herein, refers to a global feature descriptor developed for human detection in images. The global nature implies that each feature vector generated for a given image resolution is of the same size. In a general sense, HoG feature vectors utilize the wealth of information that is representative of objects in images, encoded in a gradient magnitude and direction. This may be achieved by dividing the entire image into a fine grid, with the smallest square unit referred to as a cell. For each cell, whose smallest element is a pixel, the gradient direction may be quantized into one of nine directions. The vote for the histogram may be a count or a gradient magnitude at that pixel. Similarly, a block may consist of a collection of cells, and may be formed in an overlapping fashion throughout the image. The overall concatenated histogram for each block forms a feature vector.

In accordance with the present disclosure, HoG features may be evaluated on 8×8 blocks with a cell size of 4×4. This results in 4 cells in a block. There may be a 50% overlap between blocks. In order for an effective comparison through the HoG Euclidean Distance Classifier between feature vectors to take place, the feature vectors may be resized, such that all feature vectors have the same dimensionality. Therefore, in both the actual processing and when generating prior data for comparison, the images from a candidate area may be resized. For instance, as illustrated in FIG. 6, the image of the word "Signature" may be resized at 660 to a size of 100×30 [W×H]. While 10×30 is used as an example resize of the image, examples are not so limited, and other sizes of images may be selected for resizing. A nearest neighbor interpolation technique may be employed for resizing, as the level of resizing may not be significant, and vital information may not be lost.

At 664, the HoG features of the sample in consideration (e.g., the sample feature vector) may be compared with each of a plurality of prior feature vectors, e.g., comparison feature vectors. For example, the Hog features of the word "signature" may be compared against each of 133 prior feature vectors. The smallest distance (e.g., Euclidean distance) may be stored for each case and for each candidate area.

Finally, after all the candidate lines have been processed, a threshold may be set, indicating that squared distances below the threshold value indicate a document object, such as a signature line and squared distances above the threshold indicate that the candidate area is not a document object. For instance, a threshold of 65 may be set, implying the squared distances below that value indeed indicate a signature line.

Figure 7:
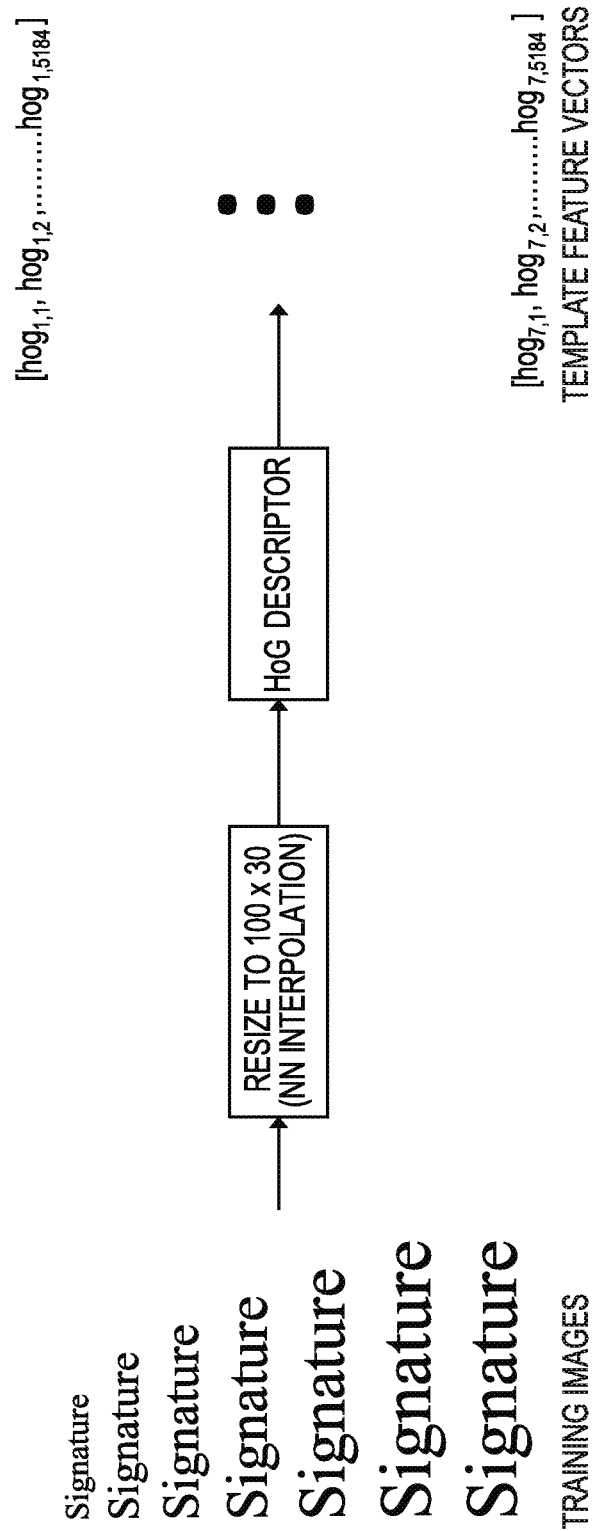
FIG. 7 illustrates an example generation of comparison feature vectors according to the present disclosure.

FIG. 7 illustrates an example generation of comparison feature vectors according to the present disclosure. As described herein, detection of document objects may be trainable, such that other document objects may be detected. Data from prior textual analysis may be used for explicit comparison to the data being examined. For example, when examining a first document for detecting document objects, data collected during the examination of the first document may be used for explicit comparison to a second document. In an offline process, HoG feature vectors may be extracted for each prior word, as shown in FIG. 7. For each font type, variants of the word "signature" along with associated colons as is common in many application forms, may be entered in a word processor in seven different fonts sizes (12-24 point) as illustrated. This accounts for the varying scale seen in many documents. The prior comparison data may be scanned so as to mimic the same image acquisition process, and may be segmented using a similar procedure as discussed in relation to FIG. 5. These HoG features, referred to herein as learned feature vectors, may be extracted and stored in a data array, and used for subsequent document analysis.

Figure 8:
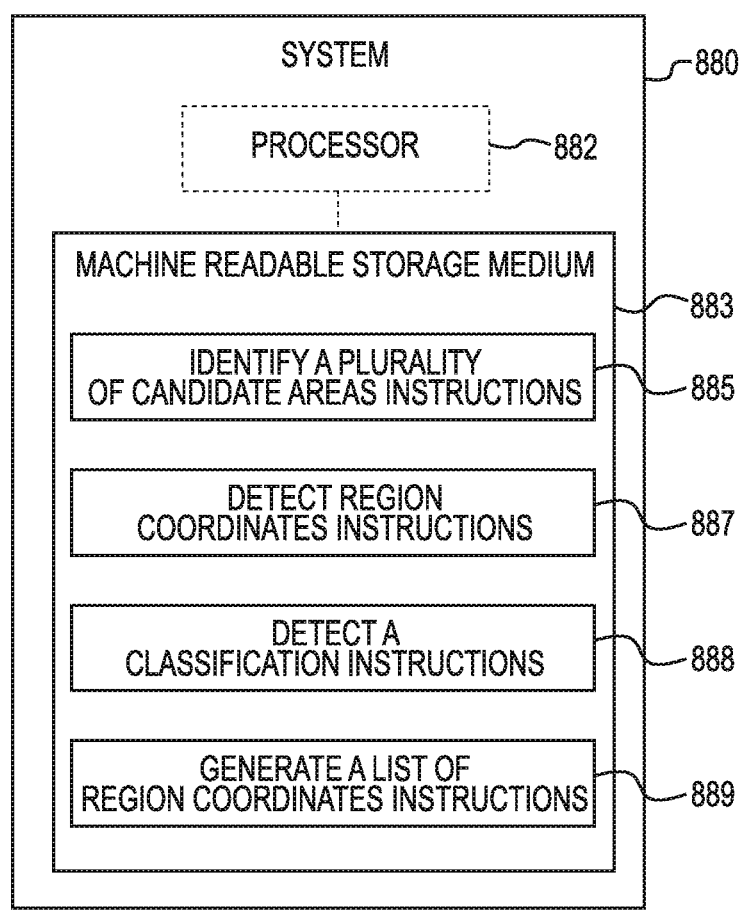
FIG. 8 is a block diagram of an example system for detecting document objects, according to the present disclosure.

FIG. 8 is a block diagram of an example system 880 for detecting document objects, according to the present disclosure. System 880 may include at least one computing device that is capable of communicating with at least one remote system. In the example of FIG. 8, system 880 includes a processor 882 and a machine-readable storage medium 883. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 880 may be one or more central processing units (CPUs), microprocessors, and/or other hardware devices suitable for retrieval and execution of instructions stored in machine-readable storage medium 883. In the particular example shown in FIG. 8, processor 882 may receive, determine, and send instructions 885, 887, 888, 889 for detecting document objects. As an alternative or in addition to retrieving and executing instructions, processor 882 may include one or more electronic circuits comprising a number of electronic components for performing the functionality of one or more of the instructions in machine-readable storage medium 883. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 883 may be any electronic, magnetic, optical, or other physical storage device that stores executable instructions. Thus, machine-readable storage medium 883 may be, for example, Random Access Memory (RAM), an Electrically-Erasable Programmable Read-Only Memory (EEPROM), a storage drive, an optical disc, and the like. Machine-readable storage medium 883 may be disposed within system 880, as shown in FIG. 8. In this situation, the executable instructions may be "installed" on the system 880. Additionally and/or alternatively, machine-readable storage medium 883 may be a portable, external or remote storage medium, for example, that allows system 880 to download the instructions from the portable/external/remote storage medium. In this situation, the executable instructions may be part of an "installation package". As described herein, machine-readable storage medium 883 may be encoded with executable instructions for monitoring network utilization.

Referring to FIG. 8, identify a plurality of candidate areas instructions 885, when executed by a processor (e.g., 882), may cause system 880 to identify a plurality of candidate areas in a document, wherein a structure of the document is unknown. For example, as discussed in relation to FIGS. 1 and 2, a Hough transform may be used to convert the document to Hough space, and connected component analysis and line detection may allow for the detection of candidate areas in the document. Further, identifying candidate areas may include identifying candidate areas meeting particular thresholds. For instance, the document object may be a signature line, and the instructions to identify the plurality of candidate areas may include instructions to identify any line in the document that is less than or equal to 100 pixels in length.

In some examples, the system 880 may include instructions executable by the processor 880 to generate a threshold of the document for a Hough transform by setting document areas below a threshold level as 1 and document areas above the threshold level as 0.

Detect region coordinates instructions 887, when executed by a processor (e.g., 882), may cause system 880 to detect region coordinates of each of the plurality of candidate areas by performing connected component analysis on the plurality of candidate areas, as discussed in FIG. 1.

Detect a classification instructions 888, when executed by a processor (e.g., 882), may cause system 880 to detect a classification of each of the plurality of candidate areas. In some examples, the instructions to detect a classification of each of the plurality of candidate areas may include instructions to compare feature vectors based on an input object, to a segment of the respective candidate area. For example, if the document object is a date line, feature vectors for date lines may be compared with the segmented region of the candidate area to determine if the candidate area is a date line. Similarly, the instructions to detect a classification of each of the plurality of candidate areas may include instructions to segment each of the plurality of candidate areas, and input the plurality of segments into a histogram of gradients Euclidean classifier that compares each of the plurality of segments to feature vectors created from various fonts and sizes of the document object.

In some examples, the system 880 may include instructions executable by the processor 882 to cause the processor to generate learned feature vectors based on the comparison of the feature vectors to the plurality of candidate areas, as discussed in relation to FIG. 7.

Generate a list of region coordinate instructions 889, when executed by a processor (e.g., 882), may cause system 880 to generate a list including the region coordinates for each candidate area among the plurality of candidate areas classified as a document object. The list of coordinates may be used to guide a user through a document to places where a signature is required, and/or may scan the document to ensure that all necessary signatures have been collected.

Figure 9:
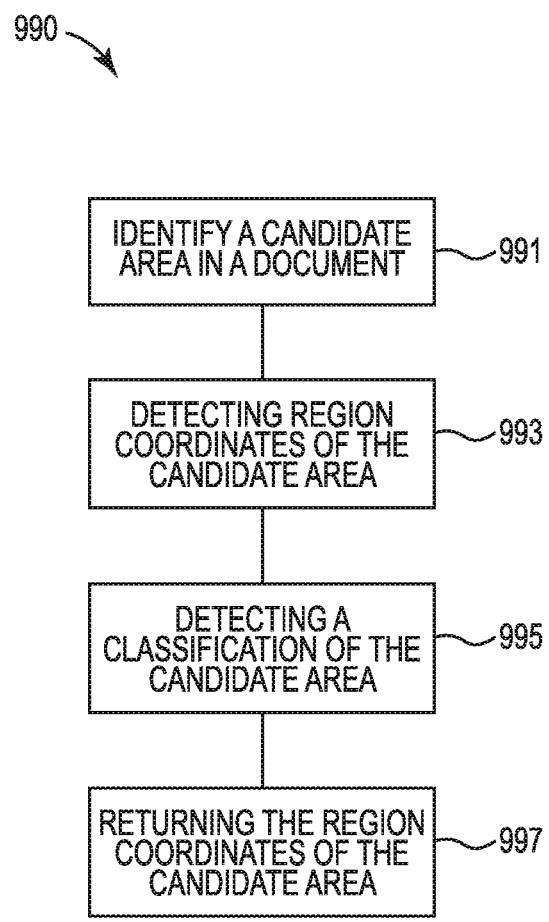
FIG. 9 illustrates an example method for detecting a document object, according to the present disclosure.

FIG. 9 illustrates an example method 990 for detecting a document object, according to the present disclosure. At 991, the method 990 may include identifying a candidate area in a document, wherein a structure of the document is unknown. As described herein, identifying the candidate area may include converting the document to Hough space using a Hough transform, conducting a connected component analysis, and detecting lines. For example, as discussed in relation to FIGS. 1 and 2, identifying the candidate area may include identifying the candidate area in the Hough space has a pixel length greater than or equal to a threshold pixel length.

At 993, the method 990 may include detecting region coordinates of the candidate area by performing connected component analysis on the candidate area, as discussed in relation to FIG. 3. Further, at 995, the method 990 may include detecting a classification of the candidate area by comparing feature vectors to the candidate area. Detecting the classification of the candidate area may include segmenting the candidate area into a plurality of segments, and inputting the plurality of text segments into a HoG Euclidean classifier. Detecting the classification of the candidate area may further include detecting that the candidate area is the document object if the output of the HoG Euclidean classifier is less than a threshold amount and detecting that the candidate area is not the document object if the output of the HoG Euclidean classifier is greater than or equal to a threshold amount.

Further, at 997, the method 990 may include returning the region coordinates of the candidate area responsive to detecting that the candidate area is a document object. As discussed herein, generating a list of the coordinates of all document objects may be used to identify all areas of the document for user input, and/or verifying that all areas for user input are in fact completed.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N" and "M", particularly with respect to reference numerals in the drawings, indicate that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system for detecting a document object, the system comprising:
   a processor; and
   a non-transitory computer-readable medium storing processor-executed instructions that upon execution by the processor are to:
      establish a threshold for a document, wherein a structure of the document is unknown;
      detect a candidate area in the document, using a Hough transform and connected component analysis to merge detected candidate areas in the Hough transform to a same document object in the document, wherein the connected component analysis includes labeling a plurality of lines as connected components upon determining the plurality of lines are actually representative of a single line in the document; and
      classify the candidate area as a document object or not a document object, wherein to classify the candidate area the processor-executed instructions are executable by the processor to:
         remove a fixed region around the candidate area;
         isolate text from the candidate area; and
         utilize a distance classifier to evaluate the isolated text from the candidate area, including comparing the isolated text from the candidate area against a feature vector and a text threshold.

2. The system of claim 1, wherein the processor-executed instructions are upon execution by the processor further to determine candidate lines that satisfy a minimum length criterion.

3. The system of claim 2, wherein the processor-executed instructions are upon execution by the processor further to identify a plurality of candidate areas in the document by identifying any area within a Hough space document having a line length less than or equal to a threshold pixel length.

4. The system of claim 1, wherein to detect a candidate area in the document, the processor-executed instructions are upon execution by the processor further to detect the candidate area has a pixel length greater than or equal to a threshold pixel length.

5. A non-transitory computer-readable medium containing instructions executable by a processor to cause the processor to:
   identify a plurality of candidate areas in a document, wherein a structure of the document is unknown;
   detect region coordinates of each of the plurality of candidate areas by performing connected component analysis on the plurality of candidate areas, wherein the connected component analysis includes labeling a plurality of lines as connected components upon determining the plurality of lines are actually representative of a single line in the document;
   detect a classification of each of the plurality of candidate areas, wherein to detect the instructions are further executable by the processor to:
      remove a fixed region around a candidate area of the plurality of candidate areas;
      isolate text from the candidate area; and
      utilize a distance classifier to evaluate the isolated text from the candidate area, including comparing the isolated text from the candidate area against a feature vector and a text threshold; and
   generate a list of the region coordinates for each of the plurality of candidate areas classified as a document object.

6. The non-transitory computer-readable medium of claim 5, wherein the document object is a signature line, and the instructions are further executable by the processor to cause the processor to identify the plurality of candidate areas include instructions to identify any line in the document that is less than or equal to 100 pixels in length.

7. The non-transitory computer-readable medium of claim 5, wherein the instructions to detect a classification of each of the plurality of candidate areas include instructions to:
   compare feature vectors based on an input object to a segment of the respective candidate area.

8. The non-transitory computer-readable medium of claim 7, further including instructions executable by the processor to cause the processor to generate learned feature vectors based on the comparison of the feature vectors.

9. The non-transitory computer-readable medium of claim 5, further including instructions executable by the processor to cause the processor to generate a threshold of the document for a Hough transform by setting document areas below a threshold level as 1 and document areas above the threshold level as 0.

10. The non-transitory computer-readable medium of claim 5, wherein the instructions to detect a classification of each of the plurality of candidate areas include instructions to:
    segment each of the plurality of candidate areas; and
    input the plurality of segments into a histogram of gradients Euclidean classifier that compares each of the plurality of segments to feature vectors created from various fonts and sizes of the document object.

11. The non-transitory computer-readable medium of claim 5, further including instructions executable by the processor to cause the processor to detect if each of the plurality of candidate areas has a pixel length greater than or equal to a threshold pixel length.

12. The non-transitory computer-readable medium of claim 5, further including instructions executable by the processor to cause the processor to determine candidate lines that satisfy a minimum length criterion.

13. A method for detecting a document object, comprising:
    identifying a candidate area in a document, wherein a structure of the document is unknown;
    detecting region coordinates of the candidate area by performing connected component analysis on the candidate area, including labeling a plurality of lines as connected components upon determining the plurality of lines are actually representative of a single line in the document;

detecting a classification of the candidate area by:
   removing a fixed region around the candidate area;
   isolating text from the candidate area; and
   utilizing a distance classifier to evaluate the isolated text from the candidate area, including comparing the isolated text from the candidate area against a feature vector and a text threshold; and
returning the region coordinates of the candidate area responsive to detecting that the candidate area is a document object.

14. The method of claim 13, wherein identifying the candidate area includes converting the document to Hough space.

15. The method of claim 14, wherein identifying the candidate area includes identifying the candidate area has a pixel length greater than or equal to a threshold pixel length.

16. The method of claim 13, wherein detecting the classification of the candidate area includes:
   segmenting the candidate area into a plurality of text segments; and
   inputting the plurality of text segments into a Euclidean classifier.

17. The method of claim 16, wherein detecting the classification of the candidate area includes detecting that the candidate area is the document object if an output of the Euclidean classifier is less than a threshold amount.

18. The method of claim 16, wherein detecting the classification of the candidate area includes detecting that the candidate area is not the document object if an output of the Euclidean classifier is greater than or equal to a threshold amount.

19. The method of claim 17, further including determining candidate lines that satisfy a minimum length criterion.

20. The method of claim 17, further including generating a threshold of the document for a Hough transform by setting document areas below a threshold level as 1 and document areas above the threshold level as 0.

* * * * *